(12) United States Patent
Jhang et al.

(10) Patent No.: US 10,612,742 B2
(45) Date of Patent: Apr. 7, 2020

(54) LIGHT REFLECTIVE COVER WITH PROTRUDING REFLECTIVE RIDGE AND ILLUMINATION APPARATUS HAVING SAME

(71) Applicant: Darwin Precisions Corporation, Taichung (TW)

(72) Inventors: Syuan-Wei Jhang, Taichung (TW); Chien-Sheng Tsai, Taichung (TW)

(73) Assignee: DARWIN PRECISIONS CORPORATION, Taichung (TW)

( * ) Notice: Subject to any disclaimer, the term of this patent is extended or adjusted under 35 U.S.C. 154(b) by 0 days.

(21) Appl. No.: 16/030,979

(22) Filed: Jul. 10, 2018

(65) Prior Publication Data

US 2019/0017674 A1    Jan. 17, 2019

(30) Foreign Application Priority Data

Jul. 14, 2017   (TW) .............................. 106123716 A

(51) Int. Cl.
  *F21S 41/00*   (2018.01)
  *F21S 41/36*   (2018.01)
  (Continued)

(52) U.S. Cl.
  CPC ................ *F21S 41/36* (2018.01); *B62J 6/20* (2013.01); *F21S 41/20* (2018.01); *B62J 6/02* (2013.01); *F21W 2107/13* (2018.01)

(58) Field of Classification Search
  CPC ........... F21S 41/36; F21S 41/338; F21S 41/20
  See application file for complete search history.

(56) References Cited

U.S. PATENT DOCUMENTS

| 4,358,816 A | 11/1982 | Soileau |
| 8,573,803 B2 * | 11/2013 | Satou .................... F21V 7/0083 362/243 |

(Continued)

FOREIGN PATENT DOCUMENTS

| CN | 201599696 | 10/2010 |
| CN | 204943273 | 1/2016 |

(Continued)

OTHER PUBLICATIONS

Taiwan Intellectual Property Office, "Office Action", dated Sep. 15, 2017.
European Search report from the EPO dated Oct. 9, 2018.

*Primary Examiner* — Gerald J Sufleta, II
(74) *Attorney, Agent, or Firm* — WPAT, PC

(57) ABSTRACT

A light reflective cover includes a concave main reflective surface and a ridge having a connecting surface, a ridge-top reflective surface, a light source end, and a light emitting end. The light source end and the light emitting end are opposite to each other. The connecting surface is opposite to the ridge-top reflective surface and connected to the main reflective surface. The ridge-top reflective surface extends between the light source end and the light emitting end. The ridge-top reflective surface includes a step for dividing the ridge-top reflective surface into a first part near the light source end and a second part near the light emitting end. The second part recesses with respect to the first part toward the connecting surface. The endpoint of the second part at the light emitting end does not protrude beyond an extension line along a first arc formed by the first part.

11 Claims, 9 Drawing Sheets

(51) Int. Cl.
　　*B62J 6/20*　　(2006.01)
　　*F21S 41/20*　　(2018.01)
　　*F21W 107/13*　　(2018.01)
　　*B62J 6/02*　　(2020.01)

(56) References Cited

U.S. PATENT DOCUMENTS

| | | | | |
|---|---|---|---|---|
| 2008/0192477 | A1* | 8/2008 | Holder | F21V 7/0008 |
| | | | | 362/294 |
| 2008/0225540 | A1* | 9/2008 | Tsukamoto | F21V 13/04 |
| | | | | 362/514 |
| 2011/0211361 | A1* | 9/2011 | Kawamura | F21V 29/70 |
| | | | | 362/516 |
| 2011/0249461 | A1* | 10/2011 | Sugie | F21S 41/192 |
| | | | | 362/516 |
| 2011/0280030 | A1* | 11/2011 | Iwasaki | F21S 41/147 |
| | | | | 362/519 |
| 2013/0141924 | A1 | 6/2013 | Tsao | |
| 2015/0009668 | A1* | 1/2015 | Zou | F21S 8/08 |
| | | | | 362/241 |
| 2015/0023039 | A1* | 1/2015 | Seo | F21S 41/147 |
| | | | | 362/516 |
| 2015/0338047 | A1* | 11/2015 | Honda | F21V 13/04 |
| | | | | 362/517 |
| 2016/0084460 | A1 | 3/2016 | Kolstee et al. | |
| 2016/0084465 | A1* | 3/2016 | Yamamoto | F21S 41/147 |
| | | | | 362/517 |
| 2016/0097511 | A1* | 4/2016 | Catalano | F21V 7/048 |
| | | | | 362/223 |
| 2016/0265734 | A1* | 9/2016 | Kanayama | F21S 41/143 |
| 2017/0059110 | A1* | 3/2017 | Reiss | B60Q 1/28 |
| 2017/0122516 | A1* | 5/2017 | Hager | F21S 41/338 |
| 2017/0153000 | A1* | 6/2017 | Sato | F21S 41/335 |
| 2017/0159902 | A1* | 6/2017 | Yamamoto | B60Q 1/0058 |
| 2017/0343173 | A1* | 11/2017 | Takada | F21S 41/00 |

FOREIGN PATENT DOCUMENTS

| | | |
|---|---|---|
| EP | 1970617 | 9/2008 |
| JP | 2011065831 | 3/2011 |
| TW | 201040065 | 11/2010 |
| TW | M413819 | 10/2011 |
| TW | M440414 | 11/2012 |
| TW | 201500692 | 1/2015 |
| TW | M498145 | 4/2015 |
| TW | M521007 | 5/2016 |

* cited by examiner

LIGHT REFLECTIVE COVER WITH PROTRUDING REFLECTIVE RIDGE AND ILLUMINATION APPARATUS HAVING SAME

BACKGROUND OF THE DISCLOSURE

1. Field of the Invention

The present invention relates to a light reflective cover and an illumination apparatus having same, and specifically, to a light reflective cover and an illumination apparatus that can improve effective light utilization.

2. Background

By means of an illumination apparatus, a user can identify an ambient environment when staying out at night, and safety is improved. For example, when the user rides a bicycle, the illumination apparatus can help the user identify whether there is an obstacle ahead, and a road condition on the ground. However, light generated by an illumination apparatus of an existing bicycle is easy to be excessively distributed at a position above a horizontal plane. Such light affects vision of a driver in an opposite direction, and further endangers user safety. In addition, a problem that light sources and internal components (for example, reflective covers) of illumination apparatuses of some bicycles are not in good cooperation exists. For example, light emitted by light sources is directly emitted without being reflected by the reflective covers. This not only reduces effective light utilization, but also possibly leads to light insufficiency ahead. Therefore, structures of existing illumination apparatuses still need to be improved.

SUMMARY

An objective of the present invention is to provide a light reflective cover, so as to increase a light deflection angle.

An objective of the present invention is to provide an illumination apparatus, so as to improve effective light utilization.

The light reflective cover includes a main reflective surface and a ridge. The main reflective surface is a concave surface. The ridge protrudes from the main reflective surface. The ridge has a light source end and a light emitting end that are opposite to each other, and a ridge-top reflective surface extending between the light source end and the light emitting end. The ridge-top reflective surface includes a first part near the light source end and a second part near the light emitting end. The ridge-top reflective surface has a step between the first part and the second part. The illumination apparatus includes the light reflective cover and a light source. The light source is disposed at one side of the light reflective cover having the main reflective surface and the ridge.

DETAILED DESCRIPTION

The present invention relates to an illumination apparatus that has a light reflective cover inside and can improve light distribution. The illumination apparatus may be used in a bicycle lamp or a handheld lighting device, but is not limited thereto.

Figure 1:
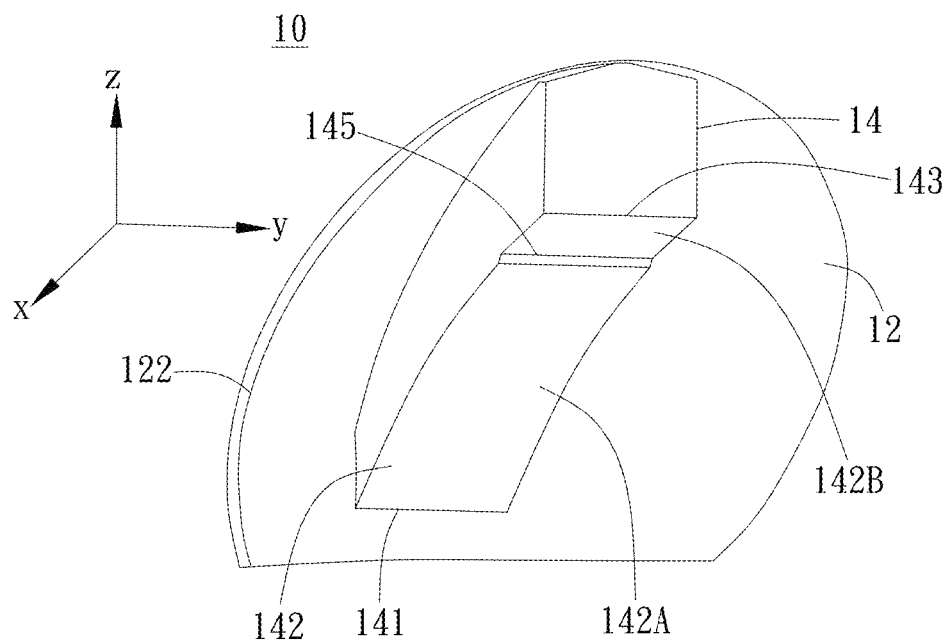
FIG. 1 is a three-dimensional diagram of an embodiment of a light reflective cover according to the present invention.

FIG. 1 is a three-dimensional diagram of an embodiment of a light reflective cover 10 according to the present invention. As shown in FIG. 1, the light reflective cover 10 includes a main reflective surface 12 and a ridge 14. The main reflective surface 12 is a concave surface. In this embodiment, an outer edge 122 of the main reflective surface 12 mainly has a circular arc shape or an elliptical arc shape. The ridge 14 protrudes from the main reflective surface 12, and has a light source end 141 and a light emitting end 143 that are opposite to each other, and a ridge-top reflective surface 142 extending between the light source end 141 and the light emitting end 143. A side surface of the ridge 14 is connected to the main reflective surface 12 and the ridge-top reflective surface 142.

The ridge-top reflective surface 142 includes a first part 142A near the light source end 141 and a second part 142B near the light emitting end 143. The ridge-top reflective surface 142 has a step 145 between the first part 142A and the second part 142B. By means of the step, light emitted to an area above a horizontal position is guided to an area below the horizontal position, to guide the light to a remote ground, thereby increasing an illumination range. In addition, as shown in FIG. 1, a vertical distance between a part of the first part 142A near the light source end 141 and the main reflective surface 12 is shorter than a vertical distance between a part of the first part 142A far away from the light source end 141 and the main reflective surface 12.

Figure 2:
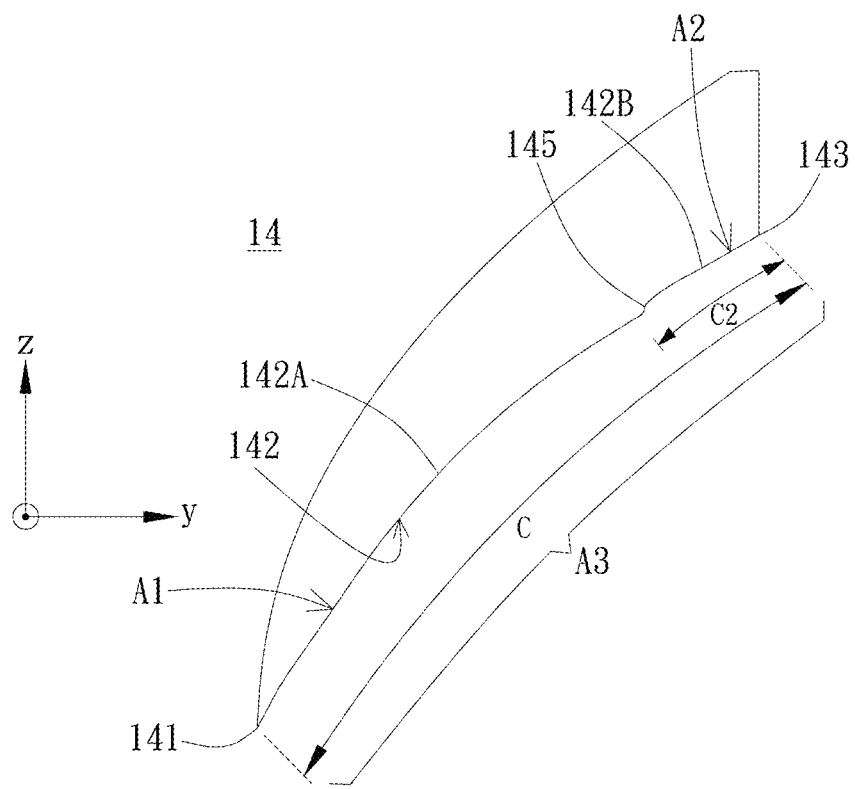
FIG. 2 and FIG. 3 are side sectional views of a ridge according to the present invention.
Figure 3:
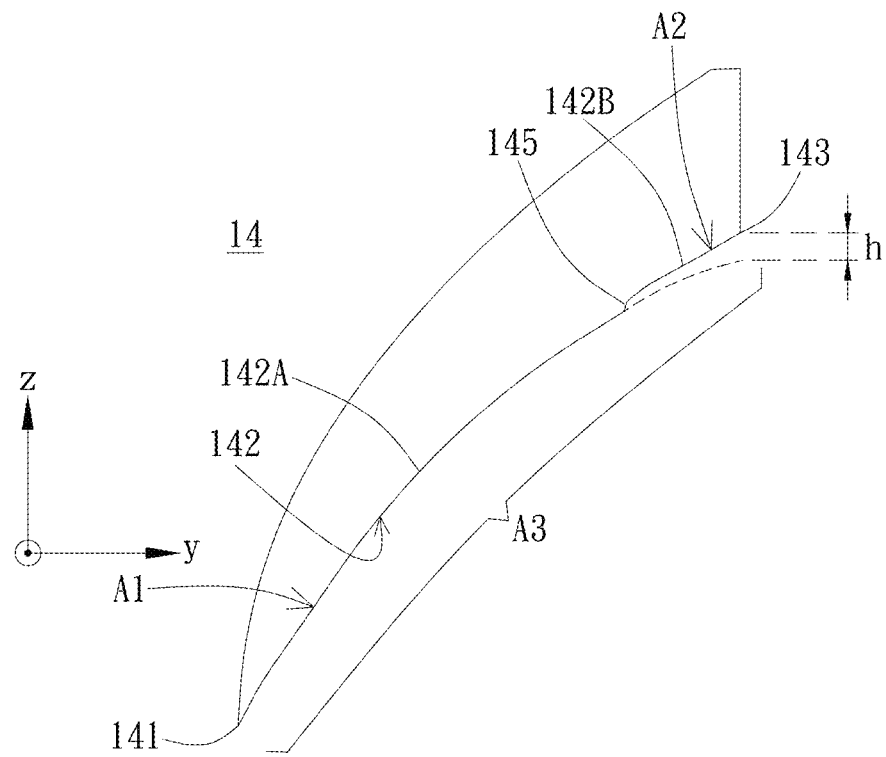

FIG. 2 and FIG. 3 are side sectional views of a ridge 14 according to the present invention. As shown in FIG. 2, on an extending path of the ridge 14 from the light source end 141 to the light emitting end 143, an arc length C2 of a second arc A2 formed by the second part 142B accounts for 10% to 30% of an arc length (C) of a third arc A3 formed by the ridge-top reflective surface 142, to reduce light distribution above the horizontal position. In another embodiment, preferably, the arc length C2 of the second arc A2 formed by the second part 142B accounts for 18% of the arc length (C) of the third arc A3 formed by the ridge-top reflective surface 142, to further reduce the light distribution above the horizontal position.

In addition, on an extending path of the ridge 14 from the light source end 141 to the light emitting end 143, an average curvature of a first arc A1 formed by the first part 142A is greater than an average curvature of the second arc A2 formed by the second part 142B. Light distribution above the horizontal position can be reduced by means of the second part with the smaller curvature. In an embodiment, on an extending path of the ridge 14 from the light source end 141 to the light emitting end 143, an endpoint of the second part 142B at the light emitting end 143 does not protrude beyond an extension line of the first arc A1 formed by the first part 142A. As shown in FIG. 3, there is a height difference (h) between the endpoint of the second part 142B at the light emitting end 143 and the extension line of the first arc A1 formed by the first part 142A. In other words, the endpoint of the second arc A2 of the second part 142B at the light emitting end 143 recesses (towards a direction z) instead of protruding, relative to the extension line of the first part 142A. In another embodiment, for example, the second arc A2 formed by the second part 142B is adjusted to have a smaller curvature. In this way, the endpoint of the arc of the second part 142B at the light emitting end 143 may be located on the extension line of the first part 142A.

Figure 4:
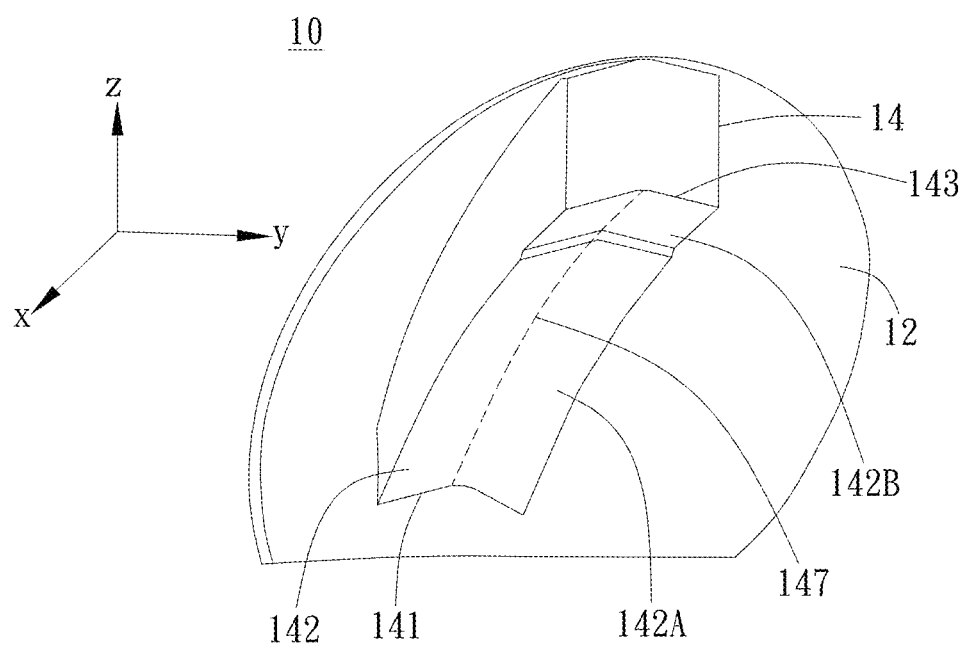
FIG. 4 is a three-dimensional diagram of another embodiment of a light reflective cover according to the present invention.

FIG. 4 is a three-dimensional diagram of another embodiment of a light reflective cover 10 according to the present invention. As shown in FIG. 4, the ridge-top reflective surface 142 has a concave ridge line 147 extending from the light source end 141 to the light emitting end 143. The concave ridge line 147 divides the ridge-top reflective surface 142 into two surfaces. An included angle between the two surfaces is less than 180°. By means of this design, when light is guided forward (for example, towards a direction y), a light pattern of emitted light may be relatively concentrative. In other words, a beam emitted from the ridge-top reflective surface 142 slightly converges towards a traveling direction of the light.

Figure 5:
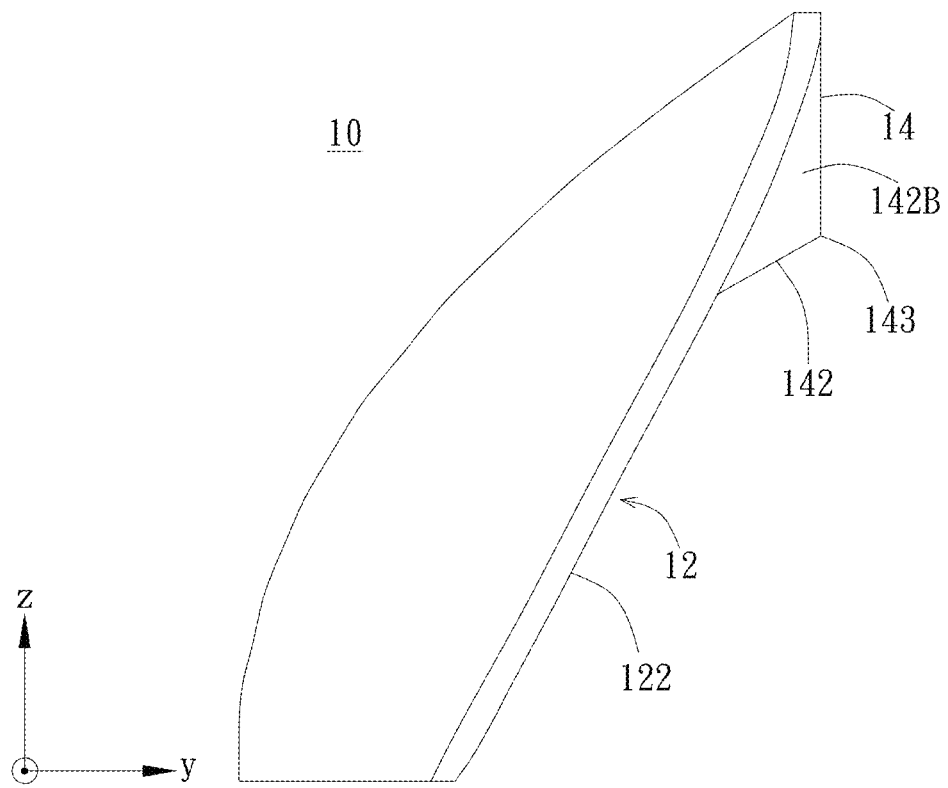
FIG. 5 is a side view of a light reflective cover according to the present invention.

FIG. 5 is a side view of a light reflective cover 10 according to the present invention. As shown in FIG. 5, the main reflective surface has an outer edge 122, and an end edge of the second part 1428 at the light emitting end 143 protrudes beyond the outer edge 122. Specifically, the second part 1428 at the light emitting end 143 protrudes, towards the direction y, beyond a virtual surface on which the outer edge 122 is located, relative to the concave main reflective surface 12. In this way, light emitted to an upper side of the outer edge may be guided to the area below the horizontal position by means of the second part 1428 of the ridge.

Figure 6A:
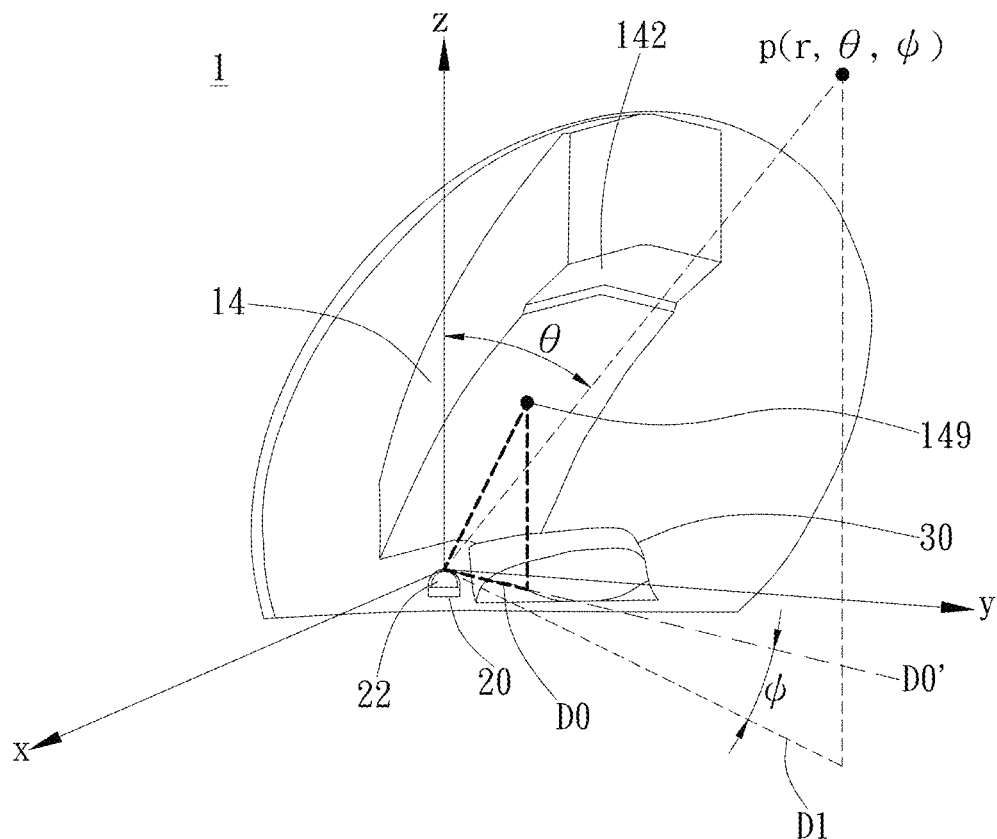
FIG. 6A is a three-dimensional diagram of an embodiment of an illumination apparatus according to the present invention.

FIG. 6A is a three-dimensional diagram of an embodiment of an illumination apparatus 1 according to the present invention. Referring to FIG. 4 and FIG. 6A, the illumination apparatus 1 includes the light reflective cover 10 and a light source 20. The light source 20 is disposed at one side of the light reflective cover 10 having the main reflective surface 12 and the ridge 14.

In this embodiment, the light source 20 has a luminous top surface 22, and preferably, the luminous top surface 22 may be a flat surface or an arc surface. In a spherical coordinate system (r, θ, φ) defined by using a center of the luminous top surface 22 as an origin, a virtual line perpendicular to the center of the luminous top surface 22 is used as a normal line to define a reference surface for the spherical coordinate system. As shown in FIG. 6A, a plane xy is used as the reference surface, and a z-axis is used as the normal line that passes through the center of the luminous top surface 22.

In this embodiment, each parameter in the spherical coordinate system is defined as follows:
  r: a distance (radial length) of a connection line from a coordinate point to the origin;
  θ: an included angle between the connection line from the coordinate point to the origin and the normal line; and
  φ: an included angle between a projected line that is of the connection line from the coordinate point to the origin and that is on the reference surface and a projected line that is of a connection line from the origin to a central point of the ridge-top reflective surface and that is on the reference surface.

As shown in FIG. 6A, a distance of a connection line from a point (p) to the center of the luminous top surface 22 is r. An included angle between the connection line from the point (p) to the center of the luminous top surface 22 and the z-axis is θ. The connection line from the point (p) to the center of the luminous top surface 22 has a projected line D1 on the plane xy. A connection line from a central point 149 of the ridge-top reflective surface to the center of the luminous top surface 22 has a projected line D0 on the plane xy. To facilitate understanding, the projected line D0 is lengthened to be an extension line D0'. As shown in FIG. 6A, an included angle between the projected line D1 and the extension line D0' (or the projected line D0) is φ. In an embodiment, the ridge-top reflective surface 142 is within a range of $-31°<\varphi<31°$.

In addition, the illumination apparatus 1 further includes an optical lens 30. The optical lens 30 is disposed on the projected line D0. Specifically, the virtual line perpendicular to the center of the luminous top surface 22 is used as the normal line (for example, the z-axis in FIG. 6A) to define the reference surface (for example, the plane xy in FIG. 6A), the connection line from the center of the luminous top surface 22 to the central point 149 of the ridge-top reflective surface 142 has the projected line D0 on the reference surface, and the optical lens 30 is disposed on the projected line D0. In another embodiment, the optical lens 30 may be disposed along an extension direction of D0 through adjustment.

Figure 6B:
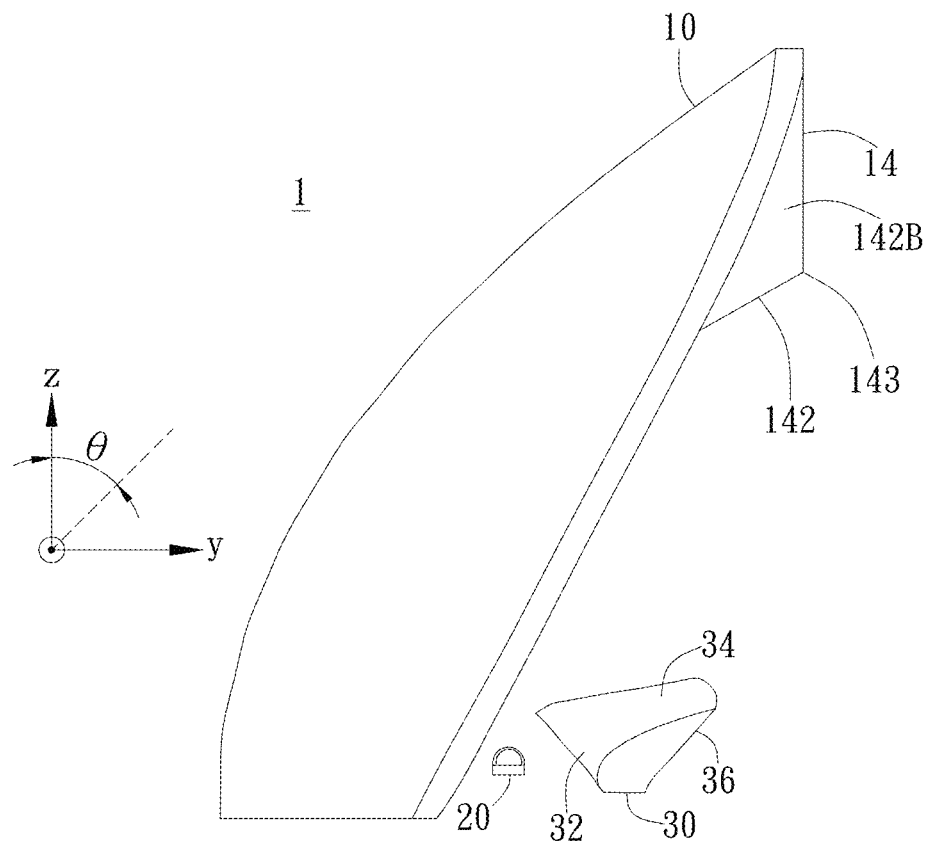
FIG. 6B is a side view of an illumination apparatus.
Figure 6C:
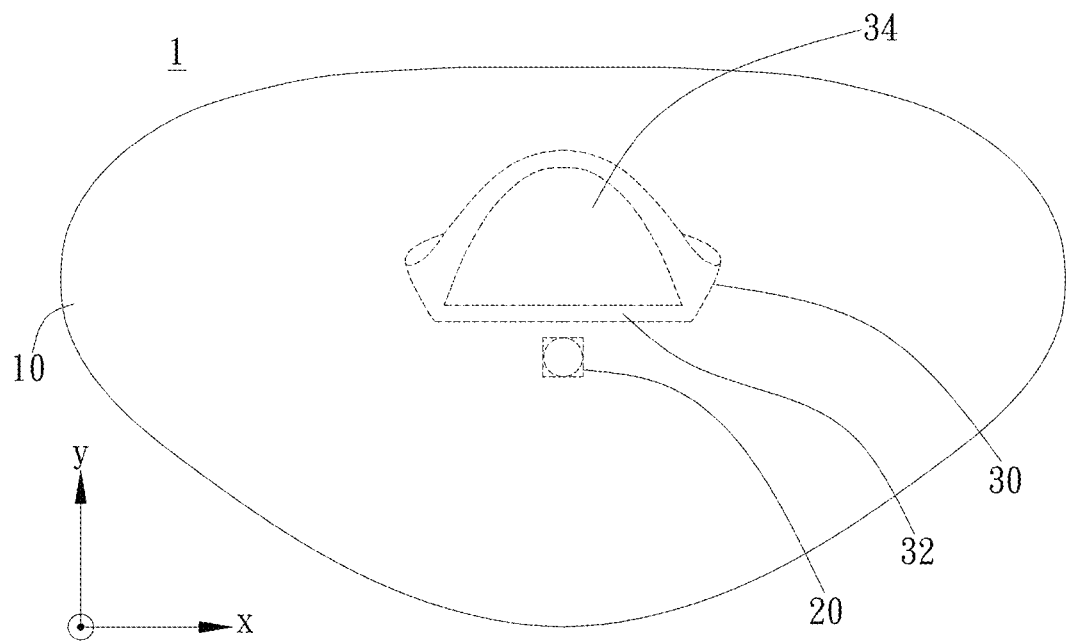
FIG. 6C is a top view of an illumination apparatus.

FIG. 6B and FIG. 6C are respectively a side view and a top view of an illumination apparatus. As described above, θ is defined as the included angle between the connection line from the coordinate point to the origin and the normal line (namely, an included angle between a connection line from the coordinate point to the center of the luminous top surface 22 and the z-axis), where an included angle between the connection line from the coordinate point to the center of the luminous top surface 22 and a positive z-axis is within a range of $-90°<\theta<90°$, and has a positive value on the side of a positive y-axis, and has a negative value on the side of a negative y-axis. In an embodiment, the ridge-top reflective surface 142 is within a range of $-90°<\theta<25°$. The second part 142B is within a range of $0°<\theta<25°$.

In addition, as shown in FIG. 6B, the optical lens 30 has a light incident surface 32, a top surface 34, and a light emitting surface 36. At least a part of the light incident surface 32 is between the light source 20 and the end edge of the second part 142B at the light emitting end 143. As shown in FIG. 6C, the optical lens 30 is entirely located within a projection range of the light reflective cover 10 on the reference surface (for example, the plane xy in FIG. 6C). In another embodiment, a position of the optical lens 30 may be adjusted according to an illumination requirement. For example, as a position of the light source 20 changes, the optical lens 30 is moved in a direction far away from the light reflective cover 10 (along the direction y) until a part of the optical lens 30 protrudes beyond the projection range of the light reflective cover 10.

Figure 7:
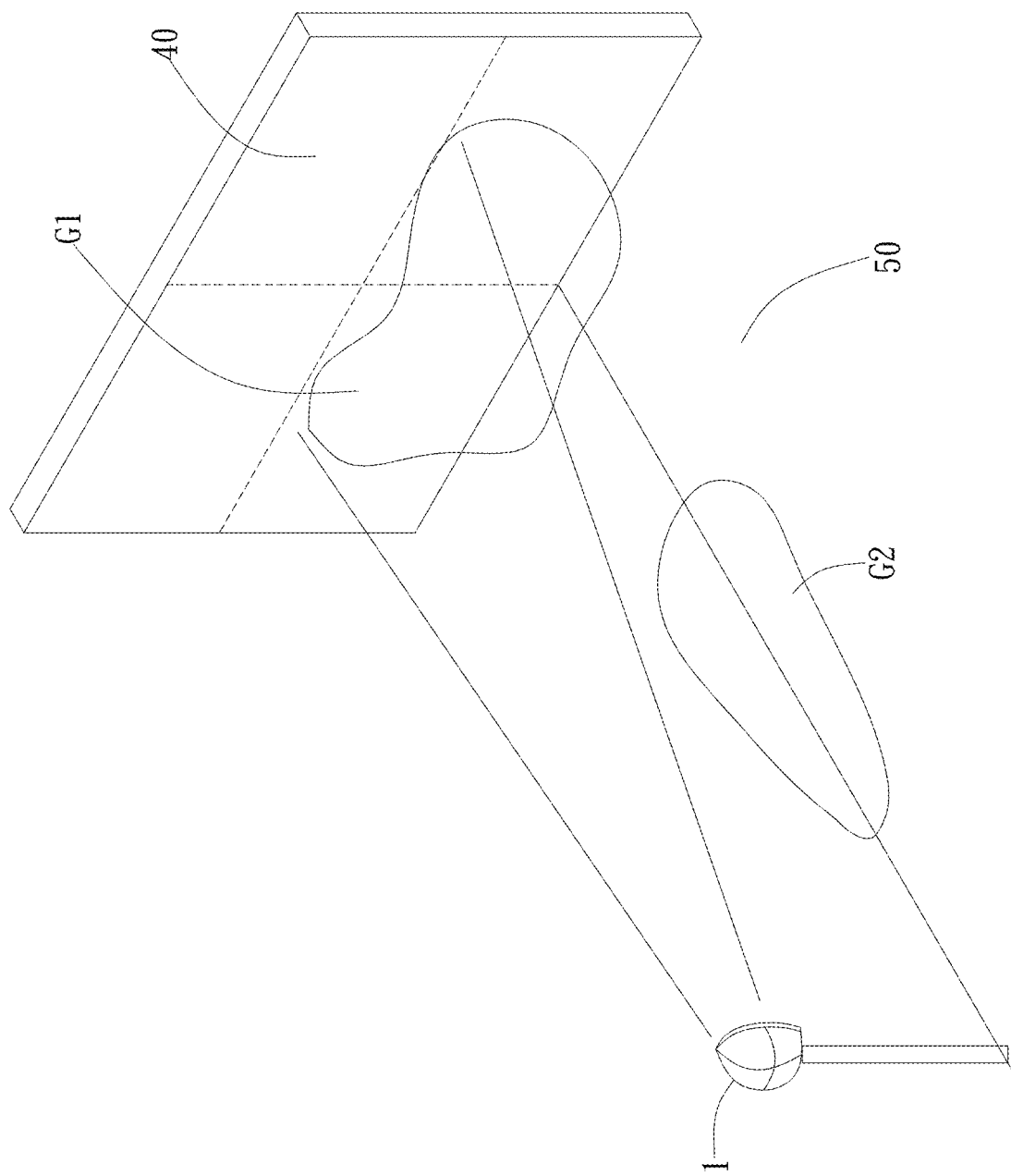
FIG. 7 is a schematic diagram of testing of an illumination apparatus.

FIG. 7 is a schematic diagram of testing of an illumination apparatus 1. As shown in FIG. 7, according to specifications of the German bicycle headlight detection regulations (StVZO 22A NO.23), illumination distribution of the illumination apparatus 1 that is at a position above a ground 50 by a particular height and that emits light to a reference plane 40 at a position over ten meters away is simulated. An illumination area G1 and an illumination area G2 are formed when the illumination apparatus 1 projects light to the reference plane 40 and the ground 50. As shown in FIG. 7, the illumination area G1 is between a position near the horizontal position (a horizontal dashed line of the reference plane) and the ground. The illumination area G2 is on the ground, extends forward from the illumination apparatus 1, and forms a long-narrow light strip.

Figure 8A:
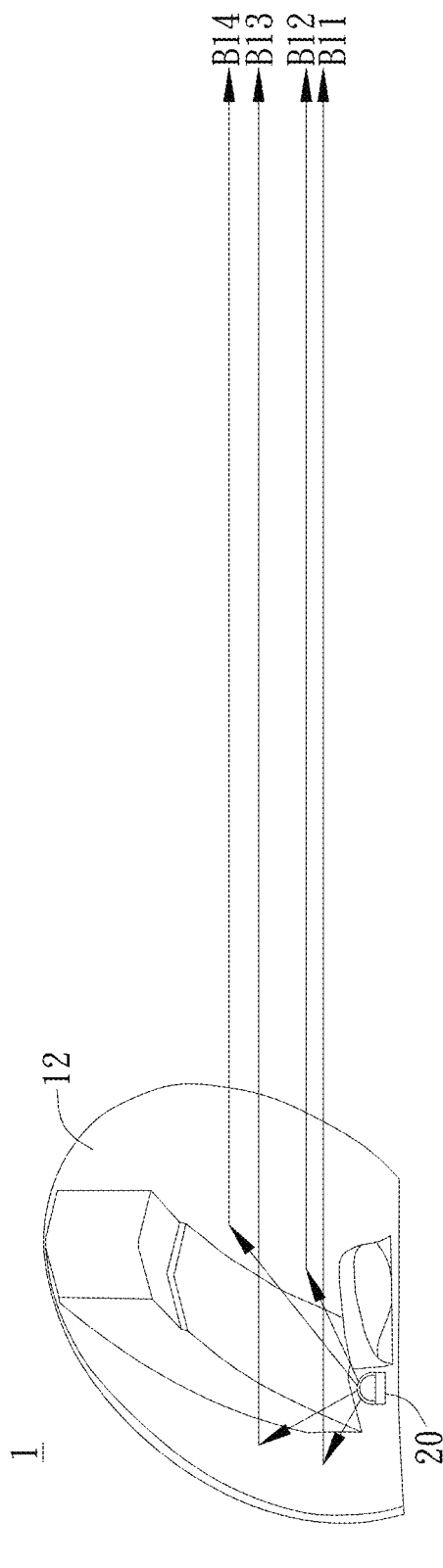
FIG. 8A, FIG. 8B, FIG. 8C, and FIG. 8D are schematic diagrams showing that a light source emits light at different positions of an illumination apparatus.

FIG. 8A, FIG. 8B, FIG. 8C, and FIG. 8D are schematic diagrams showing that a light source emits light at different positions of an illumination apparatus 1. As shown in FIG. 8A, paths of light B11, B12, B13, and B14 are formed after light emitted from the light source 20 is reflected by the main reflective surface 12. The light emitted by the light source 20 to the main reflective surface 12 is reflected by the main reflective surface 12 and is guided to the reference plane 40 (referring to FIG. 7). By means of the concave surface of the main reflective surface 12, the light can be guided to the reference plane 40, and a light pattern of the emitted light is relatively concentrative.

Figure 8B:
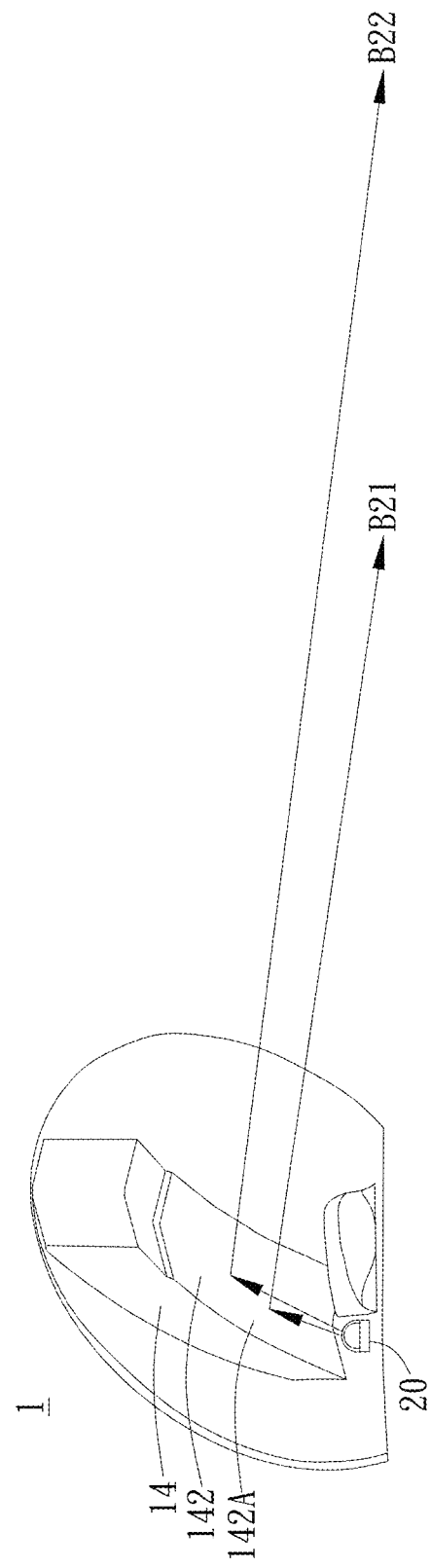

As shown in FIG. 8B, paths of light B21 and B22 are formed after the light source 20 is reflected by the first part 142A of the ridge-top reflective surface 142. The light emitted by the light source 20 to the ridge 14 is reflected by the first part 142A and is guided to the ground 50 (referring to FIG. 7). By means of this design, some light can be guided to the ground, thereby increasing an illumination range.

Figure 8C:
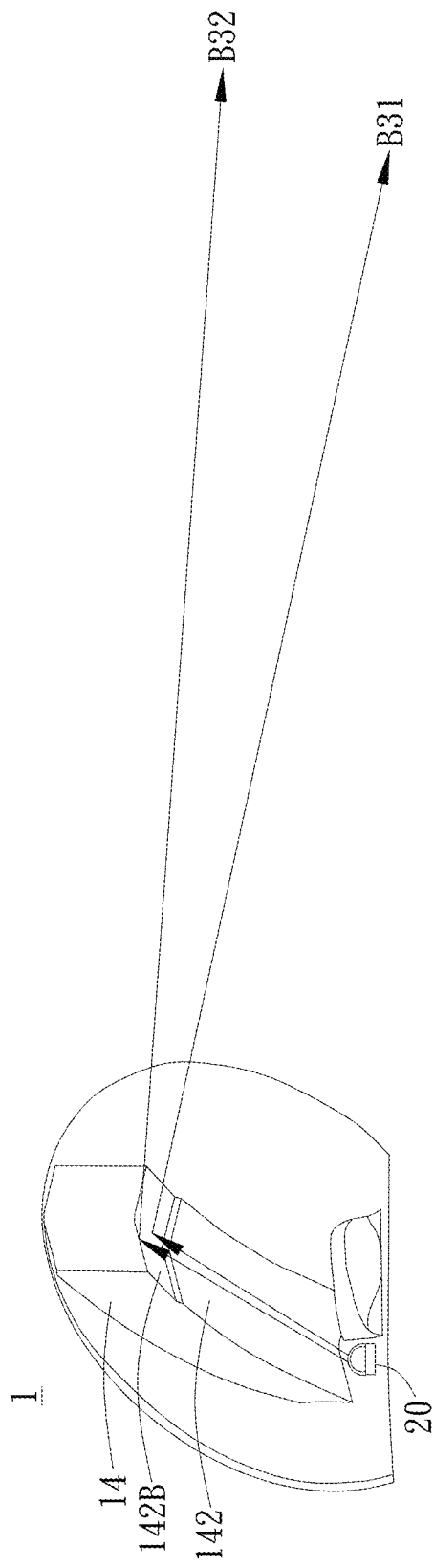

As shown in FIG. 8C, paths of light B31 and B32 are formed after the light source 20 is reflected by the second part 142B of the ridge-top reflective surface 142. The light emitted by the light source 20 to the ridge 14 is reflected by the second part 142B, and is guided to a position on the reference plane 40 near the horizontal dashed line or a lower edge of the horizontal dashed line. In other words, by means of the step of the ridge-top reflective surface, an angle between the horizontal position and light deflected to below the horizontal position can be increased, and light distribution above the horizontal position can be reduced, so as to improve effective light utilization, to guide the light to a remote ground and increase a range of an illumination area on the ground.

Figure 8D:

As shown in FIG. 8D, paths of light B41 and B42 are formed after the light source 20 is refracted by the optical lens 30. The light emitted by the light source 20 to the optical lens 30 is refracted inside the optical lens and then emitted from the light emitting surface 36, or is totally reflected by the top surface 34 and then emitted from the light emitting surface 36, to guide the light to the reference plane 40 or the ground 50. By means of this design, light projected to above the horizontal position can be guided to be near a horizontal direction and the ground, to increase a range of an illumination area on the ground, and avoid irritating a driver or a pedestrian in an opposite direction.

Figure 9:
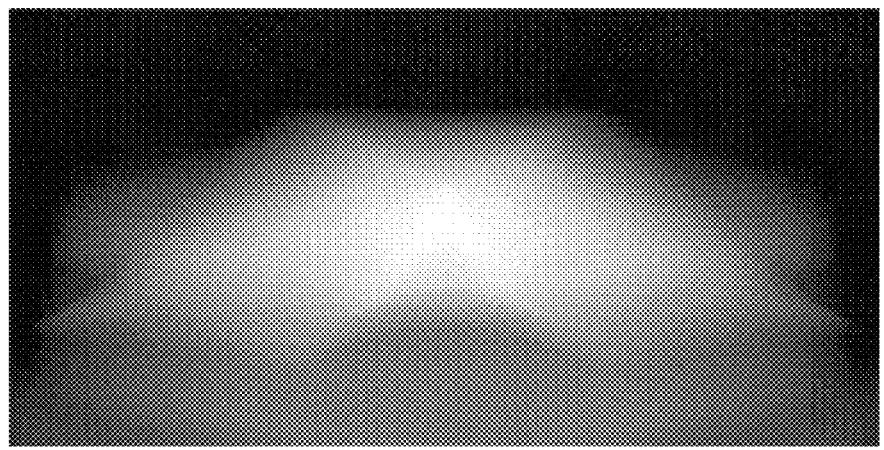
FIG. 9 is a light pattern of an illumination apparatus on a reference plane.

FIG. 9 is a light pattern of an illumination apparatus on a reference plane. As shown in FIG. 9, by means of the illumination apparatus in the present invention, light distribution above a horizontal position (for example, the horizontal dashed line in FIG. 7) can be effectively reduced, and light distribution at an upper edge of an illumination area is relatively concentrative, so as to present a clear boundary. In this way, light above the horizontal position can be prevented from irritating a driver or a pedestrian in an opposite direction. In addition, light utilization is improved, and illumination near or below the horizontal position is increased.

Figure 10:
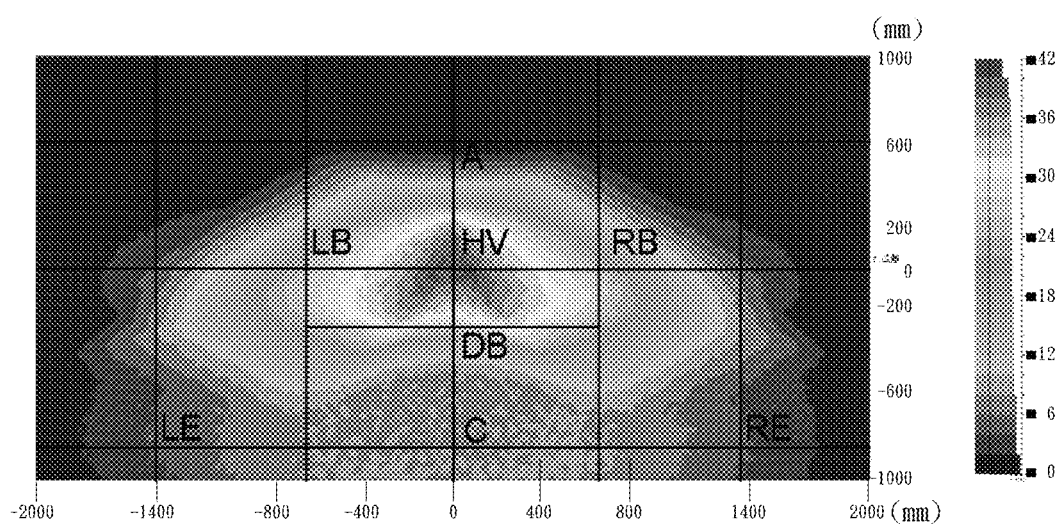
FIG. 10 is a profile of illumination distribution in simulation of an illumination apparatus on a reference plane.

FIG. 10 is a profile of illumination distribution in simulation of an illumination apparatus on a reference plane. As shown in FIG. 10, the illumination apparatus has different illumination at different positions on the reference plane. Eight different positions (A, HV, LB, RB, DB, C, LE, and RE) on the reference plane are selected according to the specifications of StVZO 22A NO.23, and illumination values (referring to Table 1) are observed.

Positions of HV-LB-RB are horizontal positions, the point HV is located exactly in a center, and the point LB and the point RB are respectively located at positions on the left and on the right of the point HV by 4°.

The point A is located at a position above the point HV by 3.4°, and is used to specify an upper limit of illumination of a position of a cut-off line.

The point DB is located at a position below the point HV by 1.5°.

The point C is located at a position below the point HV by 5°.

The point LE and the point RE are respectively located at positions on the left and on the right of the point C by 8°.

Table 1 shows testing results of the illumination values corresponding to the positions of the illumination apparatus in FIG. 10.

TABLE 1

| A < 2 | | |
|---|---|---|
| 0.11 | | |
| Pass | | |
| LB > 21.00 | HV > 20 | RB > 21.00 |
| 22.03 | 37.55 | 22.07 |
| Pass | Pass | Pass |
| | DB > 21.00 | |
| | 23.64 | |
| | Pass | |
| LE > 2 | C > 2.5 | RE > 2 |
| 2.75 | 6.61 | 2.77 |
| Pass | Pass | Pass |

As shown in Table 1, a field of each position represents (from top to bottom): an upper/a lower limit value specified in StVZO 22A NO.23, a simulated illumination value, and a testing result. The results show that, by means of the illumination apparatus in the present invention, illumination values corresponding to all positions on the reference plane can conform to the specifications. In addition, StVZO 22A NO.23 specifies a maximum illumination value ($E_{max}$) needs to be less than 1.2 times of the illumination value of the HV, and a maximum illumination value $E_{max}$ obtained by means of simulation is 34.43, which is within the specified range. It can be learned that, by means of the illumination apparatus in the present invention, light distribution can be improved, light of a light source can be effectively used, and a projection effect with sufficient illumination can be provided.

Although the preferred embodiments of present disclosure have been described herein, the above description is merely illustrative. The preferred embodiments disclosed will not limited the scope of the present disclosure. Further modification of the disclosure herein disclosed will occur to those skilled in the respective arts and all such modifications are deemed to be within the scope of the disclosure as defined by the appended claims.

What is claimed is:

1. A light reflective cover, comprising:
a main reflective surface that is a concave surface; and
a ridge, having a connecting surface, a ridge-top reflective surface, a light source end, and a light emitting end, wherein the light source end and the light emitting end are opposite to each other, the connecting surface is opposite to the ridge-top reflective surface, the connecting surface is connected to the main reflective surface, and the ridge-top reflective surface extends between the light source end and the light emitting end;
wherein the ridge-top reflective surface comprises a step for dividing the ridge-top reflective surface into a first part and a second part, the first part is near the light source end, the second part is near the light emitting end, and the second part recesses with respect to the first part toward the connecting surface; and
wherein an endpoint of the second part at the light emitting end does not protrude beyond an extension line along a first arc formed by the first part.

2. The light reflective cover according to claim 1, wherein on an extending path of the ridge from the light source end to the light emitting end, an average curvature of the first arc formed by the first part is greater than an average curvature of a second arc formed by the second part.

3. The light reflective cover according to claim 1, wherein on an extending path of the ridge from the light source end to the light emitting end, an arc length of a second arc formed by the second part is 10% to 30% of an arc length of a third arc formed by the second part and the first part of the ridge-top reflective surface.

4. The light reflective cover according to claim 1, wherein the ridge-top reflective surface has a concave ridge line extending from the light source end to the light emitting end.

5. The light reflective cover according to claim 1, wherein the main reflective surface has an outer edge, and an end edge of the second part at the light emitting end protrudes beyond the outer edge.

6. An illumination apparatus, comprising:
the light reflective cover according to claim 1; and
a light source, disposed at one side of the light reflective cover having the main reflective surface and the ridge.

7. The illumination apparatus according to claim 6, wherein the light source has a luminous top surface, and in a spherical coordinate system $(r, \theta, \varphi)$ defined by using a center of the luminous top surface as an origin, the ridge-top reflective surface is within a range of $31°<\varphi<31°$, wherein a virtual line perpendicular to the center of the luminous top surface is used as a normal line to define a reference surface for the spherical coordinate system:
$\theta$: an included angle between a connection line from a coordinate point to the origin and the normal line; and
$\varphi$: an included angle between a projected line that is of the connection line from the coordinate point to the origin and that is on the reference surface and a projected line that is of a connection line from the origin to a central point of the ridge-top reflective surface and that is on the reference surface.

8. The illumination apparatus according to claim 7, wherein the ridge-top reflective surface is within a range of $90°<\theta<25°$.

9. The illumination apparatus according to claim 7, wherein the second part is within a range of $0°<\theta<25°$.

10. The illumination apparatus according to claim 7, further comprising an optical lens, wherein a virtual line perpendicular to the center of the luminous top surface is used as a normal line to define a reference surface, a connection line from the center of the luminous top surface to a central point of the ridge-top reflective surface has a projected line on the reference surface, and the optical lens is disposed on the projected line.

11. The illumination apparatus according to claim 10, wherein the optical lens has a light incident surface, and at least a part of the light incident surface is between the light source and the end edge of the second part at the light emitting end.

* * * * *